United States Patent
Burrage et al.

[11] 3,773,640
[45] Nov. 20, 1973

[54] METHOD FOR TREATING WET PROCESS CERAMIC BODIES

[75] Inventors: Lawrence M. Burrage, South Milwaukee; Darrel D. McStrack, New Berlin, both of Wis.

[73] Assignee: McGraw-Edison Company, Milwaukee, Wis.

[22] Filed: Feb. 28, 1972

[21] Appl. No.: 230,069

Related U.S. Application Data

[62] Division of Ser. No. 852,399, Aug. 22, 1969, abandoned.

[52] U.S. Cl............. 204/180 R, 204/299, 204/301
[51] Int. Cl........................ B01d 13/02, B01h 5/00
[58] Field of Search.............. 204/180 R, 299, 301

[56] References Cited
UNITED STATES PATENTS

| | | | |
|---|---|---|---|
| 670,350 | 3/1901 | Schwerin | 204/180 R |
| 1,229,203 | 6/1917 | Schwerin | 204/180 R |
| 1,366,456 | 1/1921 | Highfield | 204/180 R |
| 1,435,886 | 11/1922 | Acton et al. | 204/180 R |
| 1,739,766 | 12/1929 | Morris | 204/180 R X |
| 1,935,962 | 11/1933 | Urbain | 204/180 R X |
| 2,085,537 | 6/1937 | Lyons | 204/180 R X |
| 2,202,717 | 5/1940 | Pattilloch | 204/180 R X |
| 2,500,878 | 3/1950 | Sieling | 204/180 R X |

FOREIGN PATENTS OR APPLICATIONS

| | | | |
|---|---|---|---|
| 3,888 | 4/1915 | Great Britain | 204/180 R |
| 135,222 | 6/1918 | Great Britain | 204/180 R |
| 145,045 | 3/1921 | Great Britain | 204/180 R |

Primary Examiner—John H. Mack
Assistant Examiner—A. C. Prescott
Attorney—R. J. Falkowski

[57] ABSTRACT

A method for processing ceramic slip into a filter cake suitable for further processing into electrical insulating bodies applies a D. C. power source across the press plates of a filter press during a portion of the pressing process. After a selected period of time the polarity of the source is reversed for a selected period.

15 Claims, 5 Drawing Figures

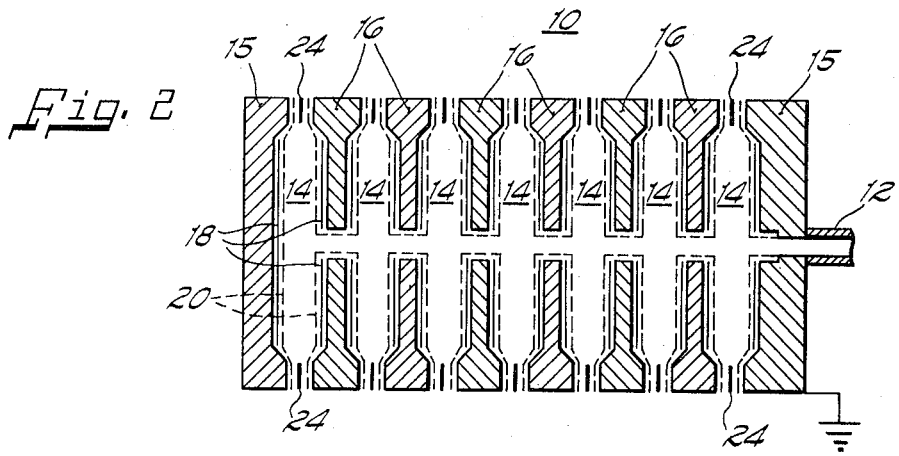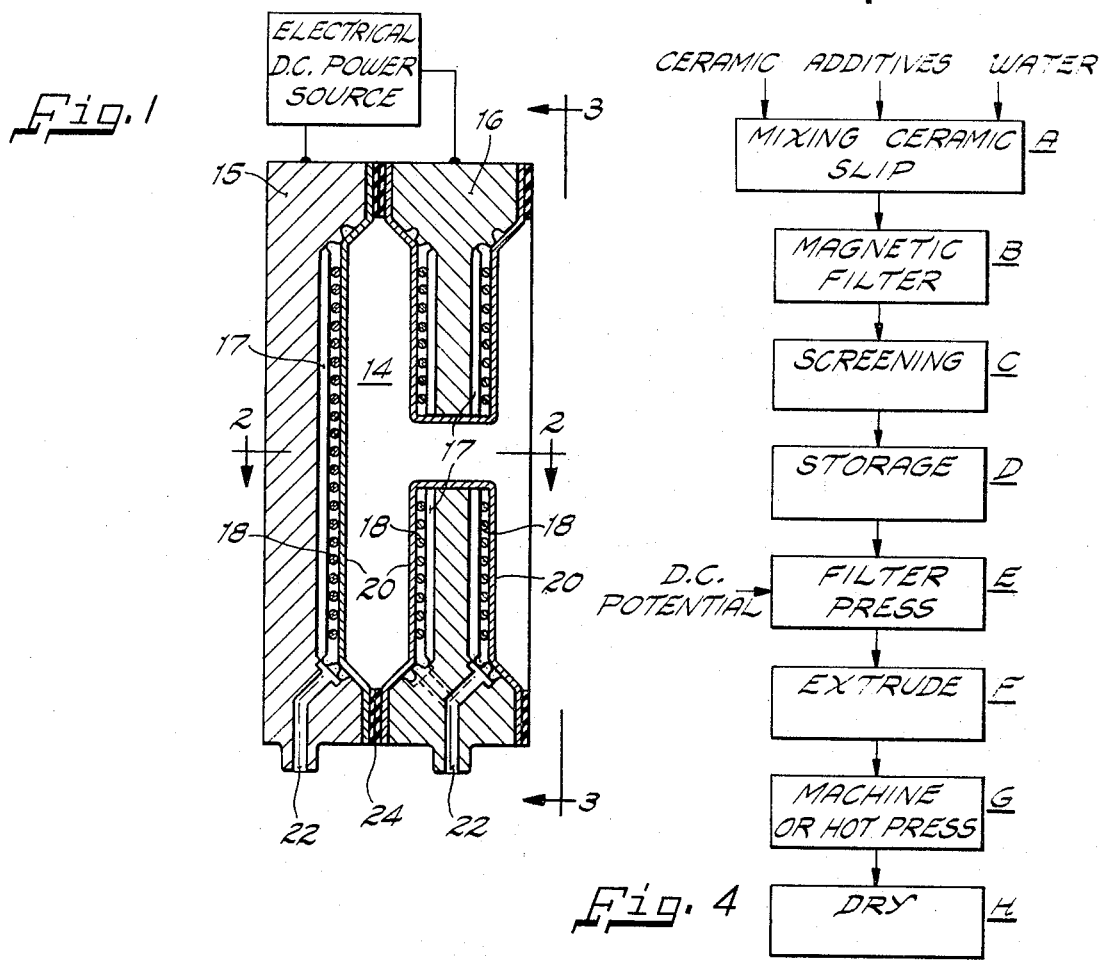

INVENTORS.
LAWRENCE M. BURRAGE
DARREL D. McSTRACK

BY Harold W. Guthman
ATTORNEY

METHOD FOR TREATING WET PROCESS CERAMIC BODIES

This application is a division of copending application Ser. No. 852,399, "Apparatus and Method for Producing Wet Process Ceramic Bodies", filed Aug. 22, 1969 now abandoned.

This invention relates in general to a method for filter pressing of wet ceramic material to produce a dried cake, and in particular to a method for applying a direct electrical current to the material during the pressing process.

Apparatus for processing porcelain wet materials, particularly ceramic materials, is available commercially for screening, mixing, pressing, extruding, glazing and firing as well as for other specialized purposes. One of the main problems in ceramic processing is the initial processing of the material to obtain uniform consistency and the desired moisture content prior to the final steps in processing the finished ceramic body. Any deviation from the set limits increases the probability of part rejection during manufacture or part failure in service. This is particularly true for electrical insulators since increased electrical voltages and load currents have resulted in stresses, electrical and mechanical, well above the standards of the past. With the process of this invention a dried material is produced from a filter press having a uniform consistency and a readily controllable moisture content.

FIG. 1 is an elevational sectional view through the center of the chamber of a single cell of a filter press usable with this invention;

FIG. 2 is a sectional plan view along line 2—2 of FIG. 1 through the center of a multichamber filter press usable with this invention;

FIG. 4 is a flow chart for a process for forming electrical insulator bodies according to this invention.

Figure 3:
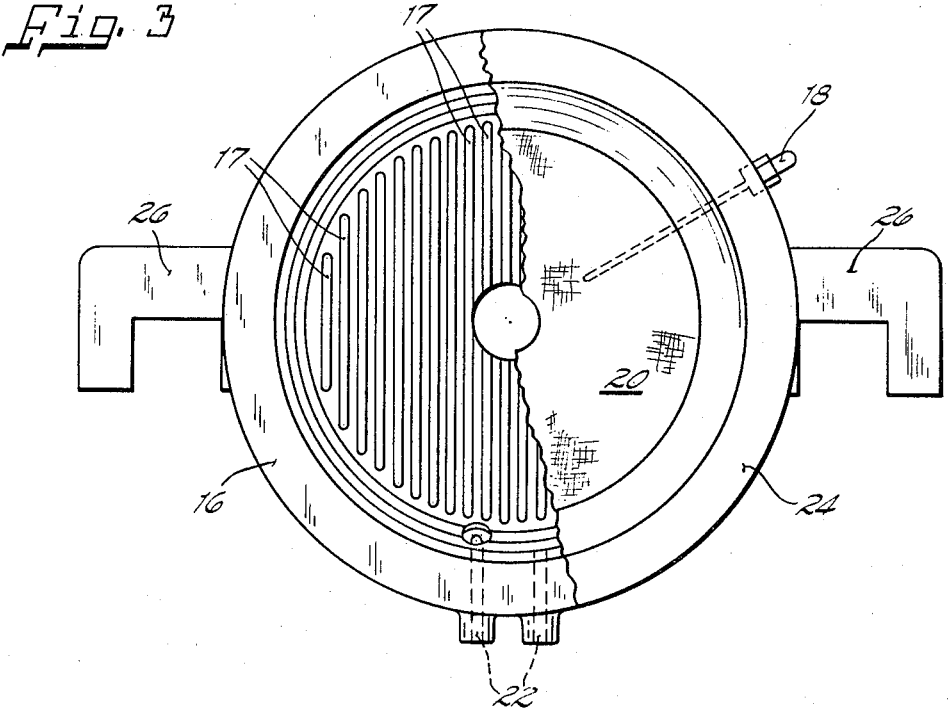
FIG. 3 is a fragmentary sectional view along line 3—3 of FIG. 1.

Referring to FIG. 1, a chamber 14 for a cell of a filter press 10 is formed between end plate 15 and press plate 16, respectively, and electrodes 18 are within the chamber respectively adjacent end plate 15 and press plate 16. Filter sacks 20 surround chamber 14 and cover electrodes 18.

Referring to FIG. 2, multicell filter press 10 receives ceramic slip under pressure from a pumping source (not shown) through inlet 12 into chambers 14. Press plates 16 and end plates 15 may be constructed of iron with an epoxy coating. Electrodes 18 are electrically conducting porous plates or screens; however, under certain conditions press plates 16 can be constructed of uninsulated electrically conductive material and serve the purpose of electrodes 18. Electrodes 18 may be constructed of aluminum, copper or a galvanized screen, but a stainless steel screen is preferred since it is less subject to corrosion. Filter sacks or cloths 20 are placed inside the internal surface of electrodes 18 so that chambers 14 are substantially enclosed by the filter sacks. The filter sacks 20 are preferably constructed of nylon, but other porous materials are satisfactory. Other polymers, cotton, paper and fiberglass are acceptable substitutes. When the plates 15 are pressed together by any known means (not shown) to seal the chambers, the ceramic material is pumped into the filter press and electrical potential is applied across the ceramic material in each chamber through electrodes 18. Fluid is forced out of the material by the pressure from the pumping source and the electrophoretic effect of the electrical current source and passes through filter sacks 20 and from the press through drains 22. This proceeds until a filter cake of the desired moisture content and consistency is obtained and the plates are then separated to remove the ceramic cakes. Insulation 24 is placed between the press plates 16 to reduce electrical power losses and eliminate the possibility of an electrical short circuit.

Referring particularly to FIG. 3, press plates 16 have vertical channels 17 for aiding in the removal of moisture by permitting the liquid to flow in the grooves to drain 22. Electrode 18 has an extension for an external electrical connection. Plate clamps 26 attached to opposite sides of each press plate 16 provide support and alignment for press plates 16.

FIG. 4 shows a process according to this invention. The ceramic slip is formed in a blunging or mixing step, A, during which the ceramic powder, water and special additives are blended into a mixture with approximately forty to sixty percent solids. Various substances are added, as desired or necessary, to improve flowability, improve the filtering rate, and adjust other factors, such as electrical conductivity.

The following step, B, comprises magnetically filtering the material to remove any metallic particles that might damage the apparatus or produce imperfections in further processing.

Step C includes screening the material to remove any large particles which would tend to destroy uniformity in the composition.

At Step D the material is stored to ensure a proper supply on demand.

The apparatus described heretofore is used in Step E which comprises forcing the wet material into the filter press at a pressure of around 180 to 250 psi and applying direct current to the ceramic material until the proper consistency is reached, usually in the range of twelve to twenty percent water content.

In Step F, the composition is extruded into blanks that can be machined or hot pressed.

Step G comprises machining or hot pressing the material as appropriate. A relatively low moisture content of less than 15 percent is preferable for machining, while a higher moisture content of approximately 18 percent is preferred for hot pressing. Because of the results obtained in uniformity of mixture and lowered moisture content, the usual drying step before the machining in Step G is usually not necessary.

After Step G, a rapid drying step, H, instead of the better known slow drying step, is possible because of the uniformity of mixture and very low residual shrinkage of the material resulting because of its lower moisture content.

Prior to Step E the mixture of clay and water is stored in a pressure tank after the blunging, magnetic filtering and screening. The additives added are selectively used to adjust the viscosity, pH, flocculation, electrical conductivity, and other properties of the slip as required.

During Step E the D. C. power source is controlled to produce potentials in the range of 40 to 150 volts per inch of cake thickness, and the current is controlled by controlling the conductivity of the ceramic slip by the use of additives if determined necessary. In order to improve the uniformity of mixture and moisture dispersion, Step E may comprise reversing the polarity of the direct current source during approximately the last twenty percent of press time. One of the test set-ups contained seven chambers (14⅝ inch dia. × 1 inch) with electrode pairs 18 connected in parallel with the power supply. A sample of the results obtained is as follows:

| | | | | | | | |
|---|---|---|---|---|---|---|---|
| Voltage | 120 | 100 | 85 | 85 | 85 | 70 | 70 |
| Initial Current | | | 47 | 54 | | | |
| Current at Shut-Down | | | 23 | 23 | 22 | | |
| Press Time (Min.) | 15 | 40 | 30 | 30 | 30 | 40 | 60 |
| Pressure (psi) | 220 | 180 | 245 | 180 | 180 | 210 | 240 |
| Original Solids Content % | | | 48 | 48 | 55 | | |
| Peak Current (Amps) | 41 | 110 | | | | 51 | 91 |
| Moisture Content (%) | 17 | 13 | 18.7 | 19.2 | 18.8 | 15.1 | 12.6 |

Figure 5:
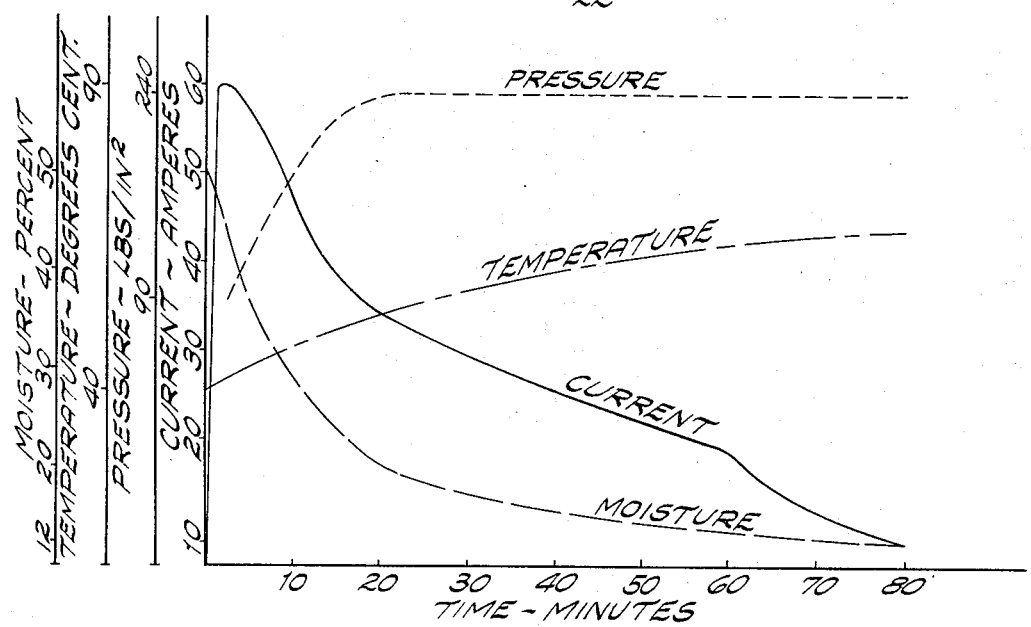
FIG. 5 is a graph of the relationship between certain test variables versus time.

FIG. 5 shows a graphical representation of the various characteristics plotted with respect to time in a typical process.

While there has not been an exact determination of the various transport phenomena in effect, it is believed that the application of the direct current power produces an electrophoretic effect that transports the clay particles to the electrodes according to their ionic charge. As the layers of clay accumulate on the electrodes, an electroosmotic effect promotes the removal of moisture therethrough. In addition the application of direct current results in the movement of dissolved ions with their associated solvent molecules to their respective electrodes. This electrical process does produce some ohmic heating that probably promotes moisture removal, but the effect of this is minor in comparison with the other electrical effects in the short times involved. Various other electrokinetic effects are present, but it is assumed that their effect is not as great as the electrophoretic and electro-osmotic effects. To those skilled in the art, it will be apparent that the possibility of an explosive threat does exist if conditions produce sufficient electrolysis of water.

Regardless of the electrokinetic phenomena involved, it has been found that this process has (1) reduced the time in the filter press from 2 to 3 hours to ten to 15 minutes, (2) reliably produced ceramic masses with approximately 12 to 20 percent moisture that are ideally suited for machining or hot pressing following an extrusion process after they have been removed from the filter press, and (3) produced ceramic masses and final porcelain products with homogeneous and isotropic characteristics which contribute to extremely high quality ceramic products.

We claim:

1. A method of filter pressing wet ceramic material comprising:
   inserting wet ceramic material into a chamber between electrically conducting electrodes;
   pressurizing said ceramic material for a selected time;
   applying an electrical direct current between said electrically conducting electrodes for a selected portion of said pressurizing time;
   reversing the polarity of the direct current for a selected period of time; and
   removing said ceramic material from between said plate assemblies.

2. A method according to claim 1 wherein said polarity is reversed for a selected period just before removing the ceramic material.

3. A method according to claim 2 wherein said selected pressure is in the range of 180 to 250 psi.

4. A method according to claim 3 wherein said the direct current is controlled to produce a potential across the ceramic material in the range of 40 to 150 volts per inch of ceramic material.

5. A method according to claim 4 having an additional preliminary step of adding and mixing to the wet ceramic material selected substances to control the electrical conductivity of the wet ceramic.

6. A method according to claim 5 having an additional preliminary step of adding and mixing to the wet ceramic a substance selected to flocculate the wet ceramic.

7. A method according to claim 6 wherein said pressure is maintained and said direct current is applied for a period of about 10 to 15 minutes.

8. A method according to claim 7 wherein said direct current is reversed in polarity for about 2 to 3 minutes at the conclusion of the period of maintaining an elevated pressure.

9. A method according to claim 1 wherein said selected pressure is in the range of 180 to 250 psi.

10. A method according to claim 1 wherein said the direct current is controlled to produce a potential across the ceramic material in the range of 40 to 150 volts per inch of ceramic material.

11. A method according to claim 1 having an additional preliminary step of adding and mixing to the wet ceramic material selected substances to control the electrical conductivity of the wet ceramic material.

12. A method according to claim 1 having an additional step, prior to inserting the material, of adding and mixing to the wet ceramic material a substance selected to flocculate the wet ceramic material.

13. A method according to claim 1 wherein said pressure is maintained and said direct current is applied for a period of about 10 to 15 minutes.

14. A method according to claim 13 wherein said direct current is reversed in polarity for about 2 to 3 minutes at the conclusion of the period of maintaining an elevated pressure.

15. A method of filter pressing wet ceramic material comprising:
   mixing ceramic powder, water, and selected additives into a mixing of approximately 40 to 60 percent solids;
   magnetically filtering the mixture to remove metallic particles;
   screening the mixture to remove large particles;
   pumping the mixture into a filter pressure to a pressure of about 180 to 250 psi;
   applying an electrical direct current to the mixture in the filter press in the range of 40 to 150 volts per inch of mixture;
   reversing the polarity of the direct current applied to the mixture for a selected period of time; and
   removing the mixture from the filter press when a desired moisture content is achieved.

* * * * *